United States Patent
Rakshit et al.

(10) Patent No.: US 10,930,265 B2
(45) Date of Patent: Feb. 23, 2021

(54) COGNITIVE ENHANCEMENT OF COMMUNICATION WITH TACTILE STIMULATION

(71) Applicant: International Business Machines Corporation, Armonk, NY (US)

(72) Inventors: Sarbajit K. Rakshit, Kolkata (IN); John M. Ganci, Jr., Durham, NC (US); Martin G. Keen, Research Triangle Park, NC (US); James E. Bostick, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 16/203,287

(22) Filed: Nov. 28, 2018

(65) Prior Publication Data
US 2020/0168205 A1    May 28, 2020

(51) Int. Cl.
| | |
|---|---|
| *G10L 15/05* | (2013.01) |
| *G06F 3/01* | (2006.01) |
| *G06N 20/00* | (2019.01) |
| *G06K 9/00* | (2006.01) |
| *G06N 5/02* | (2006.01) |

(52) U.S. Cl.
CPC .............. *G10L 15/05* (2013.01); *G06F 3/016* (2013.01); *G06F 3/017* (2013.01); *G06K 9/00302* (2013.01); *G06N 5/022* (2013.01); *G06N 20/00* (2019.01)

(58) Field of Classification Search
CPC .................................................. G06K 9/00302
See application file for complete search history.

(56) References Cited

U.S. PATENT DOCUMENTS

| | | | |
|---|---|---|---|
| 5,709,219 A | 1/1998 | Chen et al. | |
| 8,294,557 B1 | 10/2012 | El Saddik et al. | |
| 9,552,056 B1 | 1/2017 | Barry et al. | |
| 9,812,151 B1 * | 11/2017 | Amini | G06T 13/40 |
| 10,319,472 B2 * | 6/2019 | Davey | G06F 19/3418 |
| 10,325,596 B1 * | 6/2019 | Tran | H04L 63/105 |
| 10,650,701 B2 * | 5/2020 | Israr | G10L 15/22 |

(Continued)

OTHER PUBLICATIONS

J. Condliffe, "Ultrasound Can Let You Touch and Feel 3D Shapes in Thin Air." Dec. 2, 2014. https_//gizmodo.com/ultrasound-can-let-you-touch-and-feel-3d-shapes-in-thin-1665592066 [Accessed Jan. 22, 2018].

(Continued)

*Primary Examiner* — Douglas Godbold
(74) *Attorney, Agent, or Firm* — Brian Restauro, Esq.; Hye Jin Lucy Song, Esq.; Heslin Rothenberg Farley & Mesiti P.C.

(57) ABSTRACT

Methods, computer program products, and systems are presented. The methods include, for instance: determining a relationship between participants in an electronic communication. An emotion implicating a tactile stimulation is identified and a sender and a receiver of the tactile stimulation are specified. A contact point to which the tactile stimulation is applied on the body of the receiver is determined based on the relationship, according to a mapping between the relationship and the contact point as stored in a tactile stimulation knowledgebase. The tactile stimulation is delivered by use of a virtual presence user device on the side of the receiver.

25 Claims, 7 Drawing Sheets

(56) References Cited

U.S. PATENT DOCUMENTS

| | | | |
|---|---|---|---|
| 2001/0014781 A1 | 8/2001 | Nissini | |
| 2002/0080111 A1 | 6/2002 | Lake et al. | |
| 2007/0057913 A1 | 3/2007 | Eid et al. | |
| 2008/0266112 A1* | 10/2008 | van de Sluis | G06F 3/011 340/573.1 |
| 2012/0068835 A1* | 3/2012 | Li | G06F 3/016 340/407.2 |
| 2013/0328669 A1* | 12/2013 | Zhang | G08B 6/00 340/407.1 |
| 2014/0208204 A1* | 7/2014 | Lacroix | G06F 3/041 715/702 |
| 2014/0292768 A1* | 10/2014 | Tobin | G06T 13/80 345/473 |
| 2014/0313142 A1 | 10/2014 | Yairi | |
| 2015/0070148 A1* | 3/2015 | Cruz-Hernandez | G06F 3/167 340/407.1 |
| 2015/0251025 A1 | 9/2015 | You et al. | |
| 2015/0262429 A1* | 9/2015 | Shuster | A61B 5/4863 345/633 |
| 2016/0026248 A1 | 1/2016 | Petrignarti | |
| 2016/0133151 A1* | 5/2016 | O'Dowd | G09B 5/00 434/236 |
| 2016/0309023 A1* | 10/2016 | Sugimoto | H04M 1/654 |
| 2017/0068512 A1* | 3/2017 | Cho | G10L 25/48 |
| 2017/0294086 A1* | 10/2017 | Kerdemelidis | G08B 6/00 |
| 2018/0182391 A1* | 6/2018 | Lee | G06N 5/04 |
| 2018/0301140 A1* | 10/2018 | Turcott | G08B 6/00 |
| 2019/0317605 A1* | 10/2019 | Dobson | G06N 20/00 |
| 2020/0118312 A1* | 4/2020 | Ahuja | G06K 9/00302 |

OTHER PUBLICATIONS

B. Long, "Rendering volumetric haptic shapes in mid-air using ultrasound." ACM Trans. Graph. 33, 6, Article 181 (Nov. 2014), 10 pages. 2014.

E. Schwartz. "Mobile healthcare gets the feel of haptics," Jan. 20, 2014 http://www.mobihealthnews.com/news/mobile-healthcare-gets-feel-haptics-robotics-telemedicine [Accessed Jan. 22, 2018].

M. Eid, "Affective Haptics: Current Research and Future Directions," in IEEE Access, vol. 4, pp. 26-40, 2016.

D. Tsetserukou, "Emotion Telepresence: Emotion Augmentation through Affective Haptics and Visual Stimuli." Journal of Physics: Conference Series, vol. 352, (2012) 012045. http://iopscience.iop.org/article/10.1088/1742-6596/352/1/012045/meta.

D. Tsetserukou, "Enhancing Mediated Interpersonal Communication through Affective Haptics." INTETAIN 2009, LNICST 9, pp. 246-251, 2009.

M. Bianchi, "A Fabric-Based Approach for Wearable Haptics." Electronics 2016, 5, 44.

Anonymous, "Method and System for Remote Physical Interaction during Video Conference." IP.com Disclosure No. IPCOM000247501D, Publication Date: Sep. 12, 2016.

Y. Makino, "HaptoClone (Haptic-Optical Clone): Mid-air Haptic-Optical Human-Human Interaction with Perfect Synchronization" In Proceedings of the 3rd ACM Symposium on Spatial User Interaction (SUI '15). ACM, New York, NY, USA, 139-13, 2015.

P. Mell, et al. "The NIST Definition of Cloud Computing", NIST Special Publication 800-145, Sep. 2011, Gaithersburg, MD.

J. Cabibihan et a;. "Towards Humanlike Social Touch for Sociable Robotics and Prosthetics: Comparisons on the Compliance, Conformance, and Hysteresis of Synthetic Fingertip Skins" https://arxiv.org/ftp/arxiv/papers/0909/0909.3559.pdf.

A. Yu "Behold a Robot Hand with a Soft Touch" http://www.npr.org/section/alltechconsidered/2016/12/11/504953475/behold-a-robot-hand-with-a-soft-touch, Dec. 11, 2016.

* cited by examiner

COGNITIVE ENHANCEMENT OF COMMUNICATION WITH TACTILE STIMULATION

TECHNICAL FIELD

The present disclosure relates to virtual presence technology, and more particularly to methods, computer program products, and systems for cognitive generation and delivery of tactile simulation in electronic communication.

BACKGROUND

In present information technology environment, communication technology is rapidly developing and electronic communication services are ubiquitous. Mobile communication devices are essential tools of modern life in accessing vast information and convenience available over the network. Social practices on communication and relationships also change accordingly, people rely on telecommunication technologies more and more in place of in-person communication for personal connections and long-distance relationships, in addition to widespread use of various application developed for business and/or entertainment purposes. In currently available telecommunication technology utilizing audio-visual signals, people often use functionalities to express emotions such as emoticons in messaging applications. Emoticons are very popular in certain messaging applications, and are often animated to express and to share more lively emotions.

SUMMARY

The shortcomings of the prior art are overcome, and additional advantages are provided, through the provision, in one aspect, of a method. The method includes, for instance: determining, by one or more processor, a relationship between two or more participants in an electronic telecommunication session; ascertaining, by the one or more processor, an emotion expressed by a sender toward a receiver, where the emotion implicates a tactile stimulation, and where the two or more participants include the sender and the receiver; identifying, by the one or more processor, a contact point to which the tactile stimulation is applied on the body of the receiver based on the relationship from the determining, where the contact point is specified in a tactile stimulation knowledgebase as a mapping between the relationship and the contact point; and commanding, by the one or more processor, a virtual presence user device on the side of the receiver to deliver the tactile stimulation corresponding to the emotion expressed by the sender to the receiver on the contact point from the identifying.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
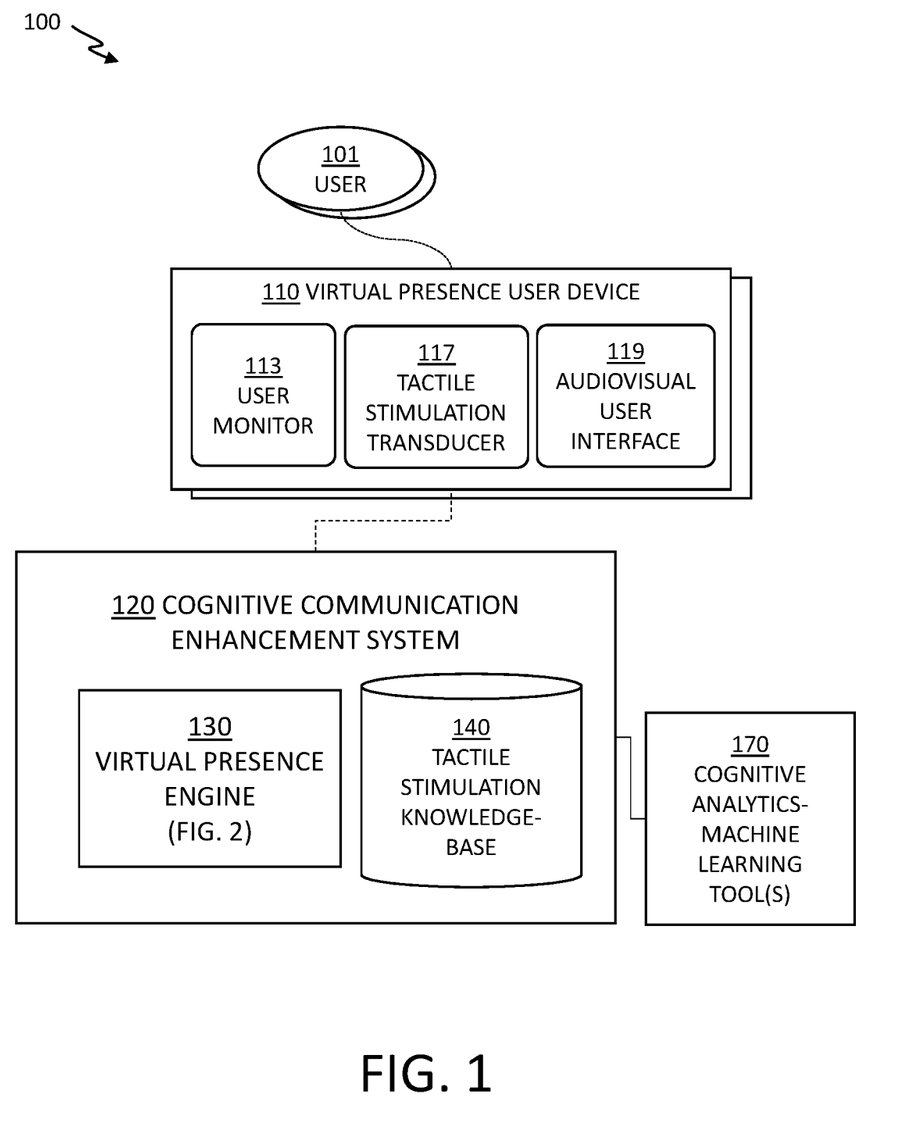
FIG. 1 depicts a system 100 for cognitive communication enhancement service, in accordance with one or more embodiments set forth herein.

FIG. 1 depicts a system 100 for cognitive communication enhancement service, in accordance with one or more embodiments set forth herein.

The system 100 includes a cognitive communication enhancement system 120 operatively coupled to a virtual presence user device 110. The cognitive communication enhancement system 120 and the virtual presence user device 110 are coupled via a communication network as described herein. In one embodiment of the present invention, the cognitive communication enhancement system 120 is physically located in a data center, often over a number of servers. In the same embodiment, the virtual presence user device 110 is located remotely from the cognitive communication enhancement system 120, within a communicable distance from a user 101 who is using the virtual presence user device 110.

The user 101 interacts with the virtual presence user device 110 to communicate with another user by accessing the cognitive communication enhancement system 120. All users 101 accesses the cognitive communication enhancement system 120, by use of respective virtual presence user devices 110. The users 101 gain accesses to the cognitive communication enhancement system 120 by subscribing the cognitive communication enhancement service. The user 101, upon registering for the cognitive communication enhancement service, authorized monitoring of physical presence and/or momentary posture of the user 101. The user 101 also authorized data collection of various user accounts that hold information helpful to establish relationship amongst two or more users 101 communicating via the cognitive communication enhancement system 120. In this specification, all users 101 subscribe the cognitive communication enhancement service and are registered with the cognitive communication enhancement system 120, either personally or under the authority of a guardian for minor users.

The virtual presence user device 110 includes a user monitor 113, a tactile stimulation transducer 117, and an audiovisual user interface 119.

The user monitor 113 of the virtual presence user device 110 monitors the user 101 audio-visually and in other ways authorized by the user 101, while the user 101 engages in a cognitively enhanced communication session with another user via the cognitive communication enhancement system 120. The user monitor 113 accordingly collects data on the conversation session and forwards to the cognitive communication enhancement system 120. The cognitive communication enhancement system 120 subsequently determines emotional states of the user 101 and any tactile stimulation that the user 101 expresses toward another user in the conversation session, based on the data obtained from the user monitor 113 of the virtual presence user device 110.

The user 101 engages the other user in the cognitively enhanced communication session primarily over the audiovisual user interface 119, for the cognitive communication enhancement service as provided by the cognitive communication enhancement system 120. The audiovisual user interface 119 of the virtual presence user device 110 includes, but is not limited to, a text interface such as a chat window, an audio interface including microphone(s) and speaker(s), a video interface including a camera and a video display of images in real time, by which the user 101 communicates with another participant of the cognitively enhanced communication session.

The tactile stimulation transducer 117 of the virtual presence user device 110 is a component that generates various respective tactile stimulations expressed by another participants in the cognitively enhanced communication session and delivers to the user 101, based on electronic control signals sent by the cognitive communication enhancement system 120. As noted, the cognitive communication enhancement system 120 determines emotional states of the users 101 in the cognitively enhanced communication session and tactile stimulates expressed by the user 101 based on the data obtained from the user monitor 113. Examples of tactile stimulations include, but are not limited to, ultrasonic pressure and haptic hologram.

In this specification, the user 101 can both send and receive tactile stimulations, and the cognitive communication enhancement system 120 determines by whom the tactile stimulation is expressed and to whom the same tactile stimulation should be delivered, for each instance of tactile stimulations in the cognitively enhanced communication session. The user 101 is representative of all participants in the cognitively enhanced communication sessions in the system 100, who can be either a sender or a receiver by each specific tactile communication, as determined by the cognitive communication enhancement system 120.

For example, if User A and User B communicate in the cognitively enhanced communication session as serviced by the cognitive communication enhancement system 120, User A can make a gesture to stroke on the head of User B at one point. The gesture of User A is monitored on the virtual presence user device 110 of User A, and the visual image of the gesture is forwarded to the cognitive communication enhancement system 120, which will generate a control command for the tactile stimulation of a stroke on the head and sends the generated control command to the virtual presence user device 110 of User B. The tactile stimulation transducer 117 of the virtual presence user device 110 on the side of User B will produce the tactile stimulation as stroking on the head for User B accordingly. At other point of time in the same cognitively enhanced communication session, User B can express a cue for another tactile stimulation toward User A, and the tactile stimulation will be delivered in a similar manner in the opposite direction to the previous example.

The cognitive communication enhancement system 120 includes a virtual presence engine 130 and a tactile stimulation knowledgebase 140. The cognitive communication enhancement system 120 is coupled to a cognitive analytics—machine learning tools 170, which supports the virtual presence engine 130 by respective functionalities. The cognitive analytics-machine learning tools 170 can also further provide natural language processing (NPL) functionalities, for analyzing emotions verbally expressed by the users 101 of the cognitively enhanced communication session for any cue on tactile stimulations.

The tactile stimulation knowledgebase 140 stores various general knowledge on tactile stimulations that are deliverable by the virtual presence user device 110. The tactile simulation knowledgebase 140 also stores a proprietary mapping between relationships of participants and tactile stimulations corresponding to respective relationships. The virtual presence engine 130 cumulates records of the emotions expressed in the context of the relationships, the tactile stimulations allocated for the relationships, and the responses by recipients to the tactile stimulations, and updates the tactile stimulation knowledgebase 140 with cumulated data on context of the emotional expressions, the tactile stimulations corresponding to respective emotional expressions, and the responses by the recipient on how a specific tactile stimulation are received.

The virtual presence engine 130 of the cognitive communication enhancement system 120 processes data obtained from the user monitor 113 and the audiovisual user interface 119 of all virtual presence user devices 110 respective to each user 101 in the cognitively enhanced communication session. The virtual presence engine 130 also commands the respective virtual presence user devices 110 to deliver various content of the cognitively enhanced communication session including audio, visual, textual, and tactile content to a proper recipient, based on the user expressions, emotional state, and various aspects of user profiles.

The virtual presence engine 130 determines a relationship between participants of the cognitively enhanced communication session based on monitoring the communication session and/or user profiles registered with the cognitive communication enhancement system 120. The virtual presence engine 130 identifies what kind of emotion is being expressed by one of the participants, that is, a sender, for the purpose of sending a tactile stimulation. The virtual presence engine 130 utilizes the cognitive analytics tool 170 in analyzing the expressed emotions. The virtual presence engine 130 identifies a receiver as the other participant toward whom the emotion had been expressed by the sender. The virtual presence engine 130 determines a tactile stimulation corresponding to the identified emotion of the sender, based on the relationship between the participants of the sender and the receiver. The virtual presence engine 130 also determines a contact point on the body of the receiver, indicating a spot to apply the tactile stimulation. The virtual presence engine 130 subsequently generates and applies the tactile stimulation to the contact point on the receiver, by use of the tactile stimulation transducer 117 on the virtual presence user device 110 on the side of the receiver. The virtual presence engine 130 subsequently determines a reaction to the tactile stimulation by the receiver, by use of the cognitive analytics tool 170. The virtual presence engine 130 updates all data collected over a current exchange, including the tactile stimulation, the reaction, and the context of the exchange, with the tactile stimulation knowledgebase 140. Detailed operations of the virtual presence engine 130 are presented in FIG. 2 and corresponding description.

Figure 2:
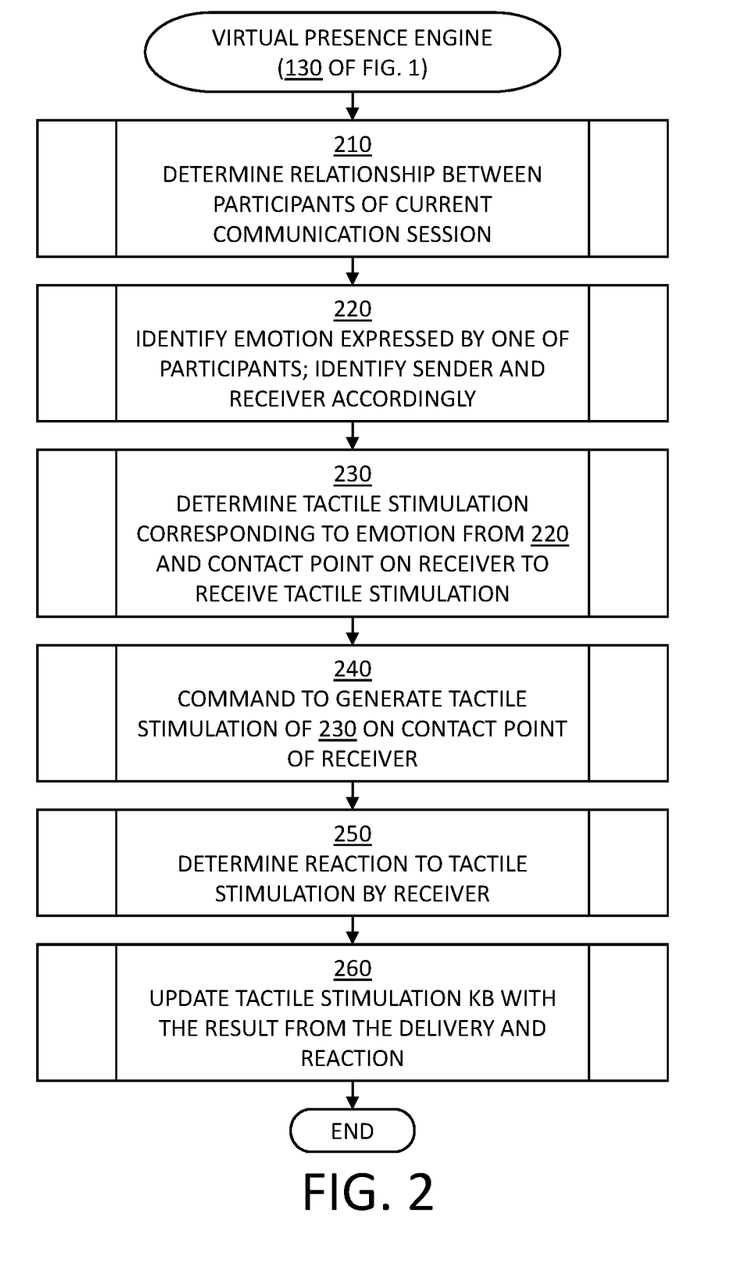
FIG. 2 depicts a flowchart of operations performed by the virtual presence engine, in accordance with one or more embodiments set forth herein.

FIG. 2 depicts a flowchart of operations performed by the virtual presence engine, in accordance with one or more embodiments set forth herein.

In block 210, the virtual presence engine 130 determines a relationship between participants of a current instance of the cognitively enhanced communication session, as being serviced by the cognitive communication enhancement system 120 and respective virtual presence user devices 110 on the participants. Then, the virtual presence engine 130 proceeds with block 220.

In certain embodiment of the present invention, the virtual presence engine 130 determines the relationship based on monitoring a predefined portion of the communication session in the beginning for interaction between the participants and analyzing the speech by use of the cognitive analytics tool 170. A natural language processing (NLP) tool of the cognitive analytics tool 170 identifies certain terms relevant to the relationship based on preset classifications, and the virtual presence engine 130 determines the relationship based on the terms classified for the relationship as discovered from the monitored portion of the cognitively enhanced communication session.

In certain embodiment of the present invention, the virtual presence engine 130 determines the relationship between the participants by use of user profiles of the participants, as provided to the cognitive communication enhancement system 120 upon subscribing the cognitive communication enhancement service.

Figure 3:
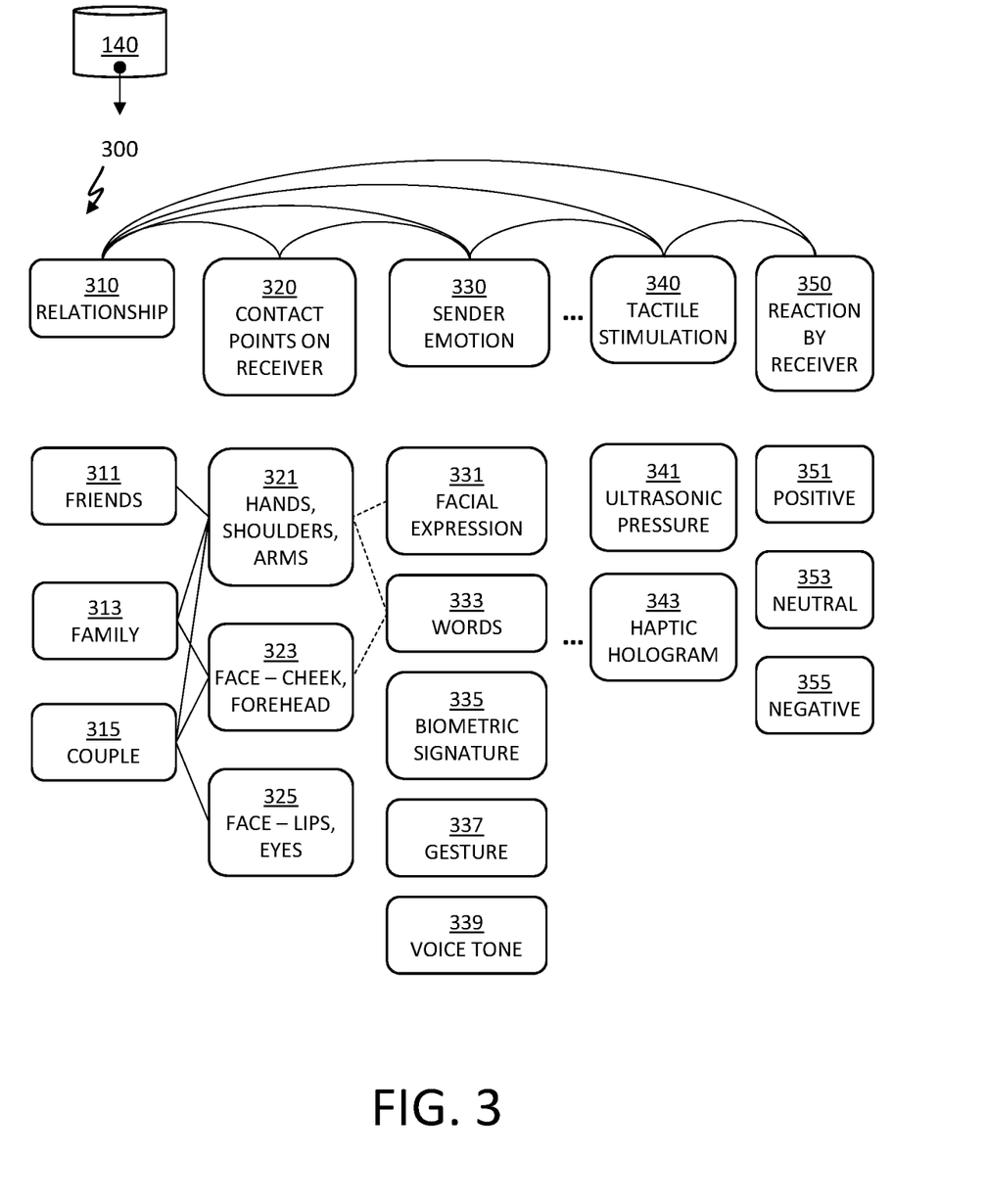
FIG. 3 depicts an exemplary mappings stored in the tactile stimulation knowledgebase 140, in accordance with one or more embodiments set forth herein.

Examples of relationships recognized in the cognitive communication enhancement system 120, in relation with other instances of categories that are relevant to the generation and delivery of tactile stimulations, are presented in FIG. 3 and corresponding description.

In block 220, the virtual presence engine 130 identifies an emotion that is being expressed by one of the participants, that is, a sender. As noted, the virtual presence engine 130 identifies the sender and a receiver respective to each instance of emotional expression that corresponds to a tactile stimulation, and accordingly, even in the same cognitively enhanced communication session, the sender and the receiver can be swapped moment to moment. Then, the virtual presence engine 130 proceeds with block 230.

In determining the emotion of the sender, the virtual presence engine 130 analyzes various data including, but not limited to, facial expressions on the sender, gestures by the sender particularly that can be converted to respective tactile stimulation, words uttered by the sender, a voice tone of the sender, and biometric signatures such as heartrate, perspiration, and blood pressure of the sender, by use of cognitive analytics tool 170. The virtual presence engine 130 identifies the receiver of the tactile stimulation that had been expressed by the sender as well. The virtual presence engine 130 identifies the receiver as the other participant of the same cognitively enhanced communication session as the sender, if there are only two (2) participants are communicating. In cases where there are more than two (2) participants in the cognitively enhanced communication session, the virtual presence engine 130 identifies the receiver by analyzing to whom the emotions of the sender had been expressed, based on words of speech by the sender, the line of sight by the sender, directions of the gesture by the sender, and combinations thereof. Examples of the emotions in the context of the relationship for generating the tactile stimulation are presented in FIG. 3 and corresponding description.

In block 230, the virtual presence engine 130 determines a tactile stimulation corresponding to the identified emotion, based on the relationship between the participants. The virtual presence engine 130 also determines a contact point on the body of the receiver, indicating a spot to apply the tactile stimulation. Then, the virtual presence engine 130 proceeds with block 240.

In certain embodiments of the present invention, the virtual presence engine 130 has certain contact points on the body of the receiver mapped to respective relationships between participants, based on social norms of personal contacts for the participants as stored in the tactile stimulation knowledgebase 140. For example, in a certain society, people greets with more personal contacts such as hugging than other societies where handshaking is normal, and accordingly, the contact points can be mapped for shoulders in the former society and for hands in the latter society. In the same example, where two participants have distinctive social norms on personal contact on the body, the virtual present engine 130 can map the contact points based on the social norm permitting less personal bodily contact and inform the participants accordingly. Further in the same example, where the social norms of personal contact on the body allows greeting strangers with hugging, participants from the same society can send and receive a tactile stimulation corresponding to a hugging without any specified relationship between the participants. Mappings of various deciding factors for delivery of tactile stimulation are established in the tactile stimulation knowledgebase 140 according to geographical locations of the participants or the social norms on the personal contacts on the body by which the participants of the cognitively enhanced communication session abide.

Similarly, in certain embodiments of the present invention, the virtual presence engine 130 has certain emotion expressed by the sender mapped to respective tactile stimulation for the receiver, based on social norms of personal contacts for the participants as stored in the tactile stimulation knowledgebase 140. For example, according to a certain social norm, the sender can express a joy with a gesture toward and a corresponding tactile impact on the body of the receiver in the same way which another sender can express an anger in another society. Also the virtual presence engine 130 calculates and stores mappings with respect to the intensities of the same tactile stimulation according to the emotion that is being conveyed in order to deliver the emotion of the sender more accurately to the receiver with the tactile stimulation. For example, by varying intensity, the same tactile stimulation can be received differently, as in cases of a pat on the head to support or to complement the receiver in comparison with a slap on the head that can be received as an offense.

Further, the contact points on the body of the receiver can be customized to reflect a pattern of normal interaction in a particular social circle, and respective contact points on the receiver can be customarily mapped in the tactile stimulation knowledgebase 140. In embodiments of the present invention, the virtual presence engine 130 cumulates data based on the aforementioned factors with regard to the interpretation of the expressed emotion by the sender and the generation and delivery of the tactile stimulation to the receiver in the tactile stimulation knowledgebase 140 by use of the machine learning tools 170.

In block 240, the virtual presence engine 130 generates a control commands and sends to the virtual presence user device 110 on the side of the receiver on which tactile stimulation to generate onto the contact point of the receiver, as selected by the virtual presence engine 130 in block 230 from the mappings of the tactile stimulation knowledgebase 140. Then, the virtual presence engine 130 proceeds with block 250.

In certain embodiments of the present invention, the virtual presence engine 130 utilizes the mappings specified in the tactile stimulation knowledgebase 140 in generating the control command for the tactile stimulation. The types of tactile stimulations are more or less physically bound to the capacity of the tactile stimulation transducer 117 installed with the virtual presence user device 110. For example, the tactile stimulation transducer 117 can be a haptic hologram generator or an ultrasonic pressure generator, of which physical characteristics are distinctive.

In block 250, subsequent to the delivery of the tactile stimulation, the virtual presence engine 130 determines a reaction of the receiver to the tactile stimulation, by use of the cognitive analytics tool 170 based on data collected by the user monitor 113 of the virtual presence user device 110 on the end of the receiver, similarly to analyzing the emotion expressed by the sender in block 220. Then, the virtual presence engine 130 proceeds with block 260.

In block 260, the virtual presence engine 130 updates all data collected over the exchange of the tactile stimulation and the reaction thereto, with the tactile stimulation knowledgebase 140. By use of the machine learning tool 170, the cognitive communication enhancement system 120 refines the mappings in the tactile stimulation knowledgebase 140, which results in more accurate decisions by the virtual presence engine 130.

Then, the virtual presence engine 130 terminates processing the current emotional expression and the delivery of a tactile stimulation corresponding to the emotional expression. In certain embodiments of the present invention, the virtual presence engine 130 loops back to blocks 220, 230, 240, 250, and 260 as a unit for each emotion expressed by the participants until the current cognitively enhanced communication session ends.

FIG. 3 depicts an exemplary mappings 300 stored in the tactile stimulation knowledgebase 140, in accordance with one or more embodiments set forth herein.

The virtual presence engine 130 of the cognitive communication enhancement system 120 utilizes the mappings stored in the tactile stimulation knowledgebase 140, in determining the tactile stimulation to deliver in the cognitively enhanced communication session. The exemplary mappings 300 include various aforementioned categories of respective data values that are utilized by the virtual presence engine 130 in determining the relationship, identifying the sender and the receiver, determining the emotion expressed by the sender, delivering a tactile stimulation corresponding to the expressed emotion, and learning the reaction to the delivered tactile stimulation.

The exemplary mappings 300 include respective data sets in categories of a relationship 310, contact points on receiver 320, sender emotion 330, tactile stimulation 340, and reaction by receiver 350. The virtual presence engine 130 associates respective instances of each category to instances of other categories relevant in generating and delivering a tactile stimulation to a receiver corresponding to an emotion expressed by a sender. The virtual presence engine 130 also utilizes contextual knowledge with regard to social norms on communication by tactile stimulation applicable for the participants, based on a relationship between the sender and the receiver, particularly on contact points of the tactile stimulation on the body of the receiver.

The category of relationship 310 includes data instances of friends 311, a family 313, and a couple 315. The data instances 311, 313, 315 are specified due to distinctive characteristics of tactile stimulation that can be exchanges between the participants of the respective relationships. In other embodiments of the present invention, the category relationship 310 includes data instances according to a scale of respective ranges of tactile stimulations such as a high, a middle, and a low levels of physical intimacy as represented in the respective tactile stimulations. In still other embodiments of the present invention, the category relationship 310 includes data instances according to a numeric scale of respective ranges of tactile stimulations appropriate amongst the participants based on social norms of personal space and physical contact for the participants in a specific society.

The category of contact points on receiver 320 includes data instances of (hands, shoulders, arms) 321, (face—cheek, forehead) 323, and (face—lips, eyes) 325. The data instances 321, 323, 325 are examples of where on the body of the receiver the sender can show physical intimacy primarily based on the type of relationships. In the present example, for the relationship of friend 311, the contact points of (hands, shoulders, arms) 421 are mapped, indicating that when the participants are friends with each other, either participant can send a tactile stimulation on the hands, shoulders, or arms on the other participant by expressing a certain emotion mapped for a tactile stimulation. Similarly, the relationship of family 313 is mapped to both contact points of (hands, shoulders, arms) 321 and (face—cheek, forehead) 323, indicating that when the participants in a cognitively enhanced communication session are family, any participant can send a tactile stimulation on the hands, shoulders, and arms, as well as cheeks and forehead on the other participant by expressing a certain emotion mapped for a tactile stimulation. Similarly, the relationship of couple 315 is mapped to all instances in the category of contact points on receiver 320, indicating that when the participants in a cognitively enhanced communication session are a couple, the virtual presence engine 130 will generate and deliver a tactile stimulation on all established contact points on the body of the receiver as expressed by the sender.

The category of sender emotion 330 includes data instances of a facial expression 331, word(s) 333, a biometric signature 335, a gesture 337, and a voice tone 339. Respective data instances of the facial expression 331, the word(s) 333, the biometric signature 335, the gesture 337, and the voice tone 339 can function like respective subcategories and can be associated with respective sets of data instances for each subcategory. For example, the virtual presence engine 130 can link many instances of verbal expressions implicating respective cases of physical intimacy with the instance for the words 333 in the category of the sender emotion 330, and accumulates and trains the mappings in the tactile stimulation knowledgebase 140.

In an exemplary case of the cognitively enhanced communication session where the participants are a parent and an infant child, when the parent lovingly says "I am giving you a goodnight kiss" during the conversation, the virtual presence engine 130 determines that the parent is the sender and the infant child is the receiver and processes to deliver a tactile stimulation corresponding to the words "goodnight kiss" uttered by the sender. The virtual presence engine 130 determines the sender emotion based on combination of the instance of the words 333 "goodnight kiss" mapped with the relationship 310 as being the family 313. The virtual presence engine 130 discovers that the contact points on the receiver 320 as being both the instance of (hands, shoulders, arms) 321 and the instance of (face—cheek, forehead) 323, and selects the instance of (face—cheek, forehead) 323 based on the context of the sender emotion 330 instance of the "goodnight kiss" words 333. An example of determining a contact point on the receiver is presented in FIG. 4 and corresponding description.

The category of tactile stimulation 340 includes data instances of an ultrasonic pressure 341 and a haptic hologram 343. In certain embodiments of the present invention, the virtual presence engine 130 creates subcategory data instances of available tactile stimulations for respective data instances of an ultrasonic pressure 341 and a haptic hologram 343. As the ultrasonic pressure 341 can be utilized as distinctive tactile stimulation depending on the intensity of the pressure, the direction of the pressure, the duration of the pressure, the pattern of the pressure, and combinations thereof, the virtual presence engine 130 can store preset respective variations of the ultrasonic pressure 341 as a specific tactile stimulation as expressed by the sender, such as "a goodnight kiss", "a pat on the shoulder", or "a slap on the wrist".

In certain embodiments of the present invention, the virtual presence user device 110 is equipped with a kind of tactile stimulation generator such as a robotic arm, a robotic face with eyes, ears, a nose and a mouth, or similar devices that are respectively motorized to mimic a human-like movements in expressing the sender emotion as a tactile stimulation and to deliver the tactile stimulation for the receiver in a way more realistic than the cases of the ultrasonic pressure 341 and the haptic hologram 343, as if the sender is present with the receiver.

The category of reaction by receiver 350 includes data instances of a positive 351, a neutral 353, and a negative 355. As noted, the virtual presence engine 130 delivers the tactile stimulation and monitors how the receiver responds to the tactile stimulation, visually or verbally. In the same example as above where the parent is sending a goodnight kiss to the infant child, the infant child can react to the tactile stimulation by, for instance, laughing, crying, smiling, frowning, touching the contact point, that is, the forehead, where the tactile stimulation had been applied, with or without face, stretching arms toward the image of the sender as presented on the virtual presence user device 110, or many other reactions. The virtual presence engine 130 analyzes respective motions and facial expressions of the receiver and categorizes the reaction into one of the data instances of the positive 351, the neutral 353, and the negative 355.

The virtual presence engine 130 can adjust the mappings according to the reactions. For example, the virtual presence engine 130 can remove or reduce weights for the mappings up to the delivery of the tactile stimulation that had resulted in the negative 355 in the reaction by the receiver 350 category, while increasing weights for the mappings of the relationship-contact points—sender emotion-tactile stimulation or otherwise prioritizes the mappings that results in the positive 351 reaction by the receiver 350 category.

Figure 4:
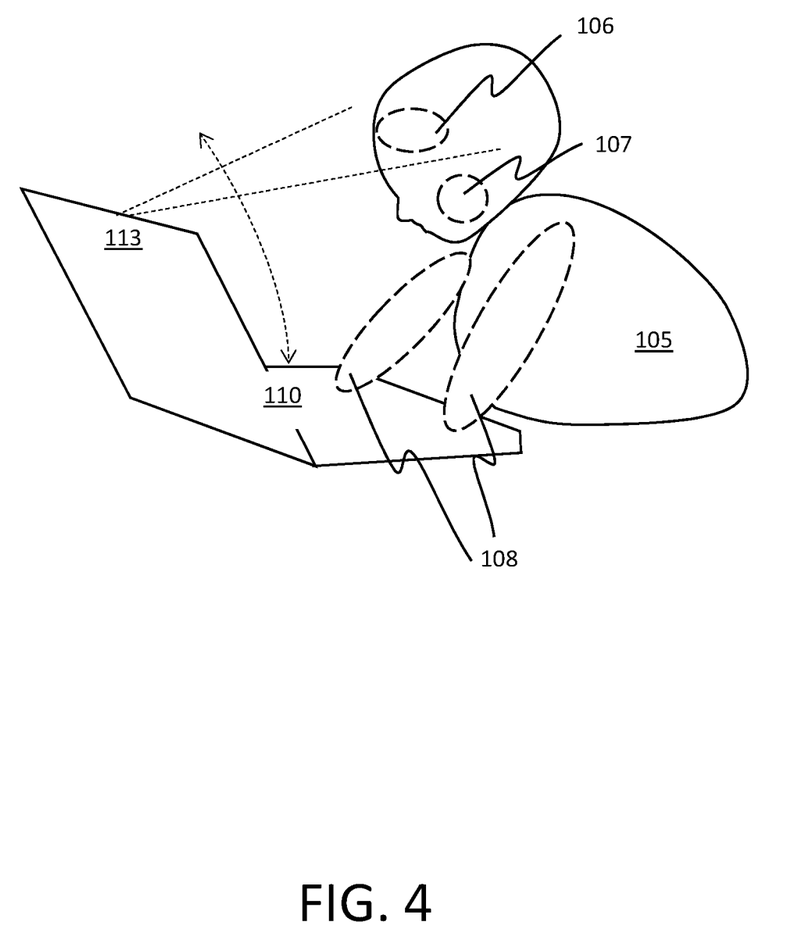
FIG. 4 depicts an example of contact points on a receiver of tactile stimulation from a sender as delivered by the cognitive communication enhancement system, as generated by the configuration profile automation engine, in accordance with one or more embodiments set forth herein.

FIG. 4 depicts an example of contact points on a receiver of tactile stimulation from a sender as delivered by the cognitive communication enhancement system, as generated by the configuration profile automation engine, in accordance with one or more embodiments set forth herein.

In FIG. 4, a receiver 105 is an infant child participating in a cognitively enhanced communication session with a parent who is away from the location of the receiver 105. The receiver 105 sits in front of the virtual presence user device 110, and the user monitor 113 component such as a camera of the virtual presence user device 110 scans the receiver 105 and identifies a forehead 106, cheek(s) 107, and hands 108. Upon determining that the parent wishes to give a goodnight kiss to the receiver 107, the virtual presence user device 110 generates and applies a tactile stimulation similar to a soft touch onto the forehead 106 on the receiver 105, according to the mappings of the family relationship, and the contact points on the receiver as established in the tactile stimulation knowledgebase 140. In certain embodiments of the present invention, the virtual presence engine 130 can further divide family relationship into parent-infant child, parent-teenage child, parent-grownup child, grandparent-grandchild, aunt/uncle—niece/nephew, cousins, in-laws, and other relations.

In certain embodiments of the present invention, the virtual presence engine 130 can cumulate a pattern in exchanging tactile stimulation and customize the tactile stimulation for a pair of particular participants. For example, one parent normally gives a goodnight kiss to his/her child on the cheek, and another parent does the same on the forehead. The virtual presence engine 130 can learn over the cognitively enhanced communication sessions for the respective pairs of parent-child, or register such preferences upon subscription, and applies when determining the contact point on the respective receivers.

The virtual presence user device 110 monitors the receiver 105 for reaction by use of the user monitor component 113 and relays the monitored data to the virtual presence engine 130 for analysis and training of the tactile stimulation knowledgebase 140, as described in blocks 250 and 260 of FIG. 2.

In certain embodiments of the present invention, the virtual presence user device 110 can be implemented as a room-sized device in which the receiver 105 can entirely be surrounded, in order to increase the available contact points on the body of the receiver and provide a better virtual presence experience for the participants. For example, while communicating with a cognitively enhanced communication service, participants who communicate from distinctive climate zones talk about how the weather is in their respective locations, and one participant expresses that the other participant could feel a warm breeze that he/she is enjoying. In the same example, with the surrounding virtual presence user device 110 can deliver the temperature and the continued air flow as the tactile stimulation expressed as "the warm breeze." In another example, when a parent wishes to hug the a child while communicating with a cognitively enhanced communication service, the surrounding virtual presence user device 110 delivers a tactile stimulation emulating a hug on multiple contact points around the body of the child.

Certain embodiments of the present invention automatically, by use of cognitive analytics tools, determines relationships between participants of an electronic communication, identifies an emotion of one participant implicating a tactile stimulation onto another participant, determines where on the body of a receiver of the tactile stimulation should be applied, and commands a tactile stimulation transducer/generator on the side of the receiver to deliver the tactile stimulation so determined. Certain embodiments of the present invention offers the tactile stimulation to the electronic communication in order to enhance virtual presence of the participants of the electronic communication. By use of the tactile stimulation transducer/generators embedded in the virtual presence user devices for respective participants, the embodiments of the present invention facilitate electronic telecommunications with human-like touches in order to improve effectiveness of the communications and to maximize the perception of virtual presence of the participants in electronic telecommunications. Certain embodiments of the present invention further monitors the reaction of the receiver on the delivered tactile stimulation, in order to assess the effect of the delivered tactile stimulation. Certain embodiments of the present invention utilizes a tactile stimulation knowledgebase, along with machine learning tools, in order to cumulate and calibrate mappings amongst relationships, expressed emotions, contact points, tactile stimulations, and reactions. Certain embodiments of the present invention improves user experience in electronic telecommunications greatly by adding another sensory dimension of touch to the electronic telecommunications. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription on the cognitively enhanced communication service. The configuration profile automation service can be provided for subscribed business entities and/or local providers of the cognitively enhanced communication service in need from any location in the world.

Figure 5:
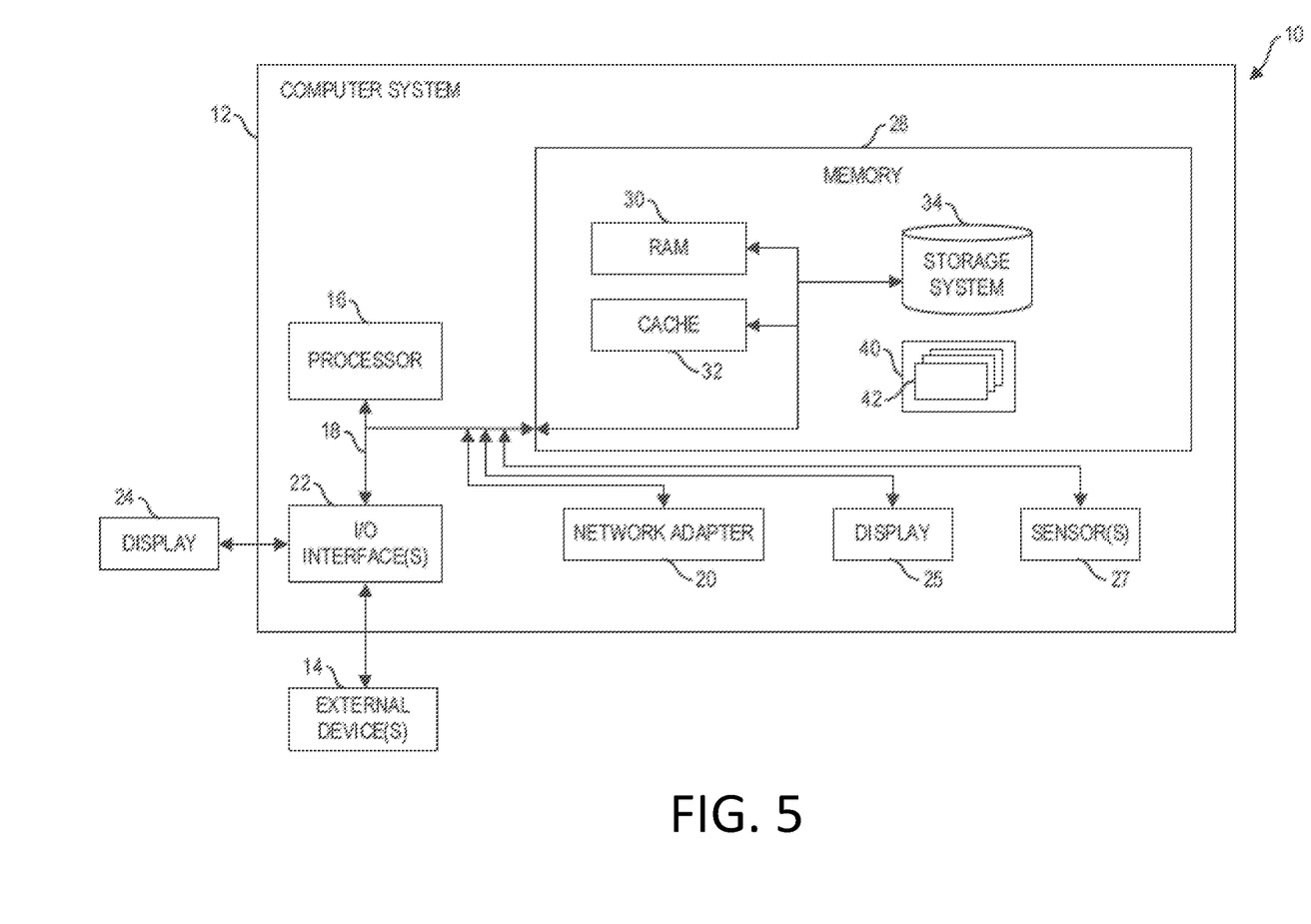
FIG. 5 depicts a cloud computing node according to an embodiment of the present invention.
Figure 6:
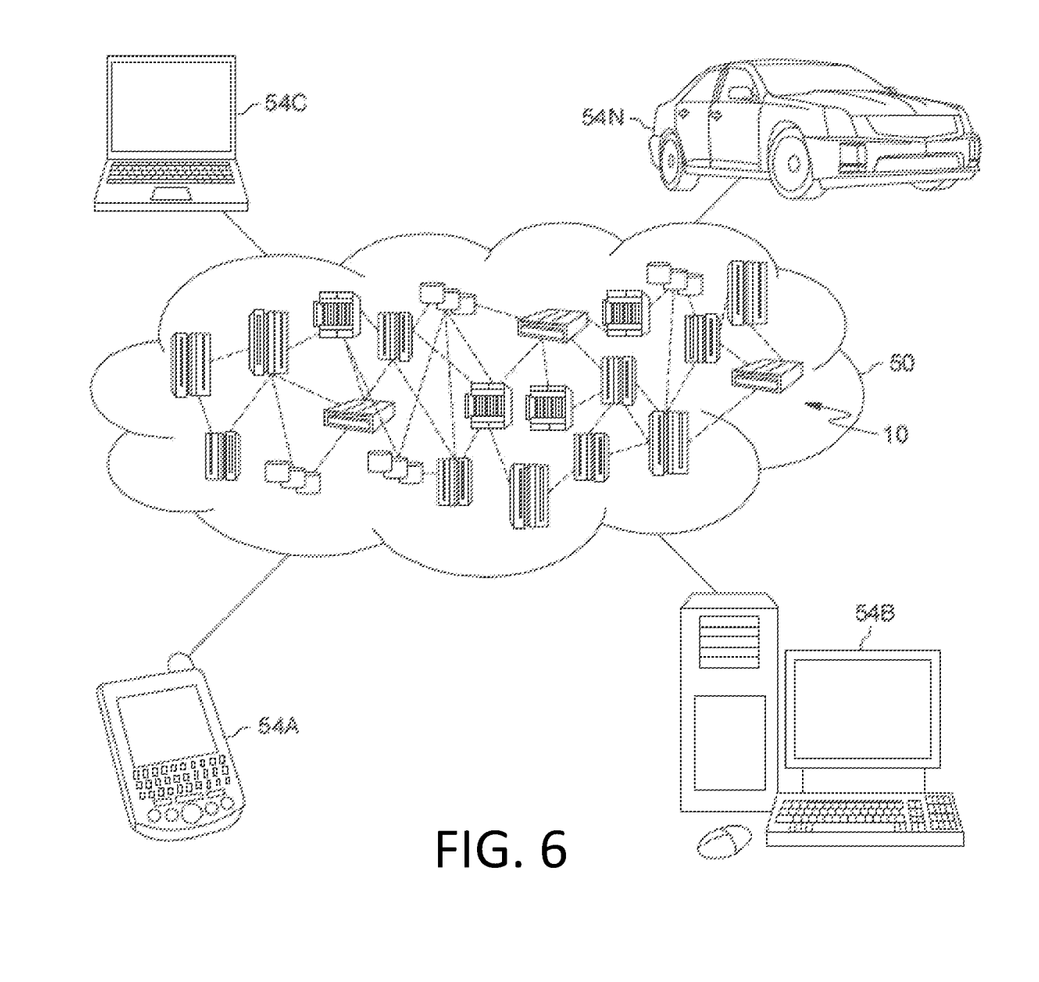
FIG. 6 depicts a cloud computing environment according to an embodiment of the present invention.
Figure 7:
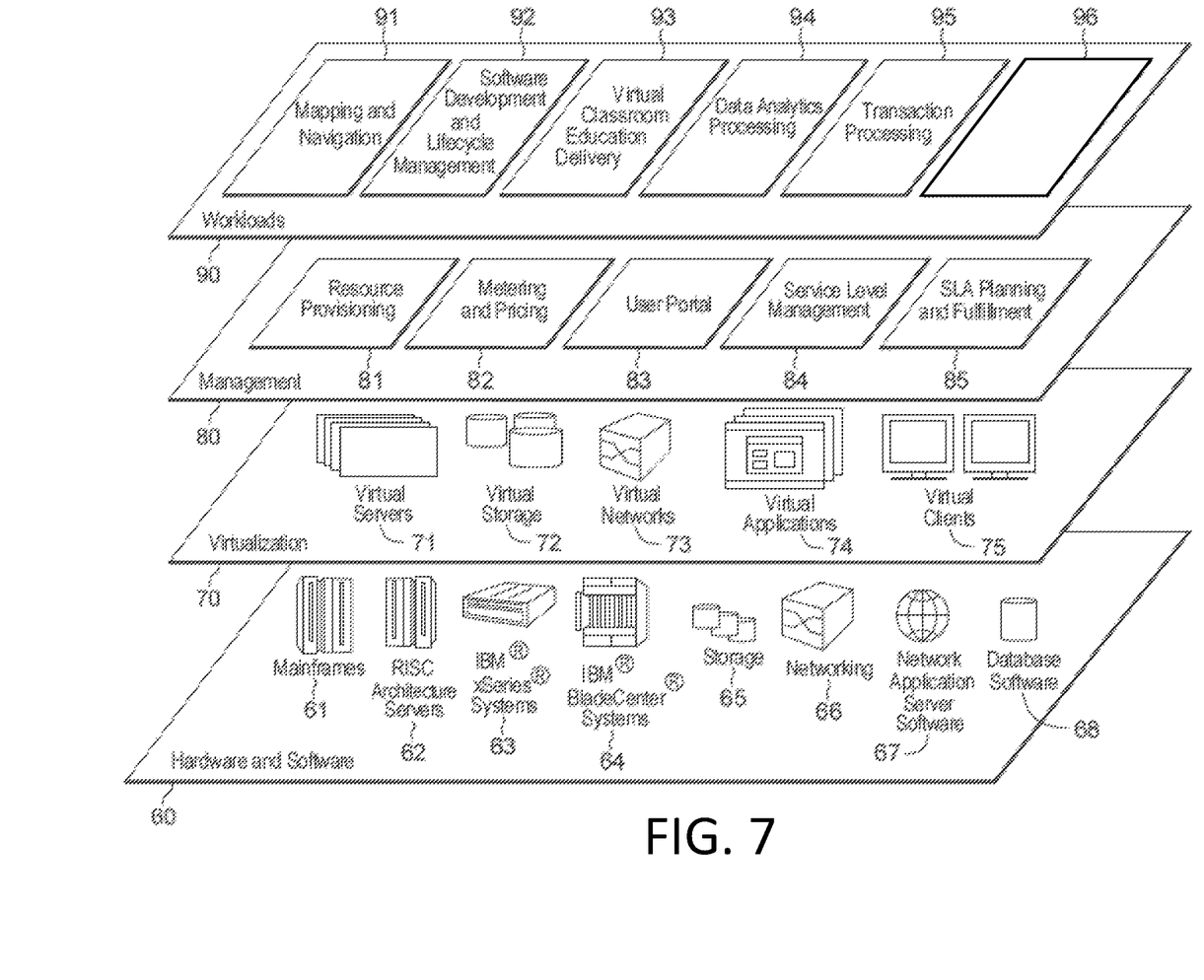
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the virtual presence engine 130 and the cognitive communication enhancement system 120 of FIG. 1, respectively. Program processes 42, as in the virtual presence engine 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive communication enhancement services provided by the cognitive communication enhancement system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   determining, by one or more processor, a relationship between two or more participants in an electronic telecommunication session;
   ascertaining, by the one or more processor, that an emotion expressed by a sender toward a receiver, via a user interface utilizing audio, video, and text, implicates a tactile stimulation, wherein the two or more participants include the sender and the receiver;
   identifying, by the one or more processor, a contact point to which the tactile stimulation is applied on the body of the receiver based on the relationship from the determining, wherein the contact point is specified in a tactile stimulation knowledgebase as a mapping between the relationship and the contact point on the receiver; and
   commanding, by the one or more processor, a virtual presence user device on the side of the receiver to deliver the tactile stimulation corresponding to the emotion expressed by the sender to the receiver on the contact point from the identifying.

2. The computer implemented method of claim 1, further comprising:
   monitoring the receiver for a reaction to the tactile stimulation delivered upon the commanding; and
   analyzing the monitored reaction in relation with the tactile stimulation, the sender, and the relationship.

3. The computer implemented method of claim 2, further comprising:
   updating the mapping in the tactile stimulation knowledgebase with the reaction such that the mapping is reinforced when the reaction is positive, the mapping is weakened when the reaction is negative, and the mapping remains unchanged when the reaction is neutral.

4. The computer implemented method of claim 1, the determining comprising:
   monitoring speeches of the sender and the receiver in the beginning of the electronic telecommunication session;
   analyzing the speeches from the monitoring by use of one or more cognitive analytic tool, including natural language processing; and
   concluding the relationship based on detecting any terms from the speeches indicating the relationship.

5. The computer implemented method of claim 1, the determining comprising:

retrieving respective user profiles of the sender and the receiver, wherein the respective user profiles had been previously generated for the sender and the receiver; and identifying the relationship between the sender and the receiver as provided in the respective user profiles.

6. The computer implemented method of claim 1, the ascertaining comprising:

monitoring interaction of the participants in the electronic telecommunication session;

discovering the emotion on the sender that is associated with the tactile stimulation from facial expressions, gestures, and words used by the sender toward the receiver in the monitored interaction.

7. The computer implemented method of claim 1, the identifying comprising:

searching the tactile stimulation knowledgebase for one or more mapping matching the relationship from the determining for the participants, wherein the one or more mapping associates respective relationships and contact points;

selecting the mapping amongst the one or more mapping from the searching based on the tactile stimulation implicated by the emotion of the sender from the ascertaining.

8. The computer implemented method of claim 1, wherein mappings in the tactile stimulation knowledgebase associate respective elements selected from categories of relationship, contact points on the receiver, sender emotion, tactile stimulation, and reaction by the receiver.

9. The computer implemented method of claim 1, the commanding comprising:

sending a command signal to a tactile stimulation transducer of the virtual presence user device for the receiver to generate the tactile stimulation with a specific combination of an intensity, a direction, a duration, and a pattern corresponding to the emotion from the ascertaining, wherein the tactile stimulation is an ultrasonic pressure.

10. A computer program product comprising:

a computer readable storage medium readable by one or more processor and storing instructions for execution by the one or more processor for performing a method comprising:

determining a relationship between two or more participants in an electronic telecommunication session;

ascertaining that an emotion expressed by a sender toward a receiver, via a user interface utilizing audio, video, and text, implicates a tactile stimulation, wherein the two or more participants include the sender and the receiver;

identifying a contact point to which the tactile stimulation is applied on the body of the receiver based on the relationship from the determining, wherein the contact point is specified in a tactile stimulation knowledgebase as a mapping between the relationship and the contact point on the receiver; and commanding a virtual presence user device on the side of the receiver to deliver the tactile stimulation corresponding to the emotion expressed by the sender to the receiver on the contact point from the identifying.

11. The computer program product of claim 10, further comprising:

monitoring the receiver for a reaction to the tactile stimulation delivered upon the commanding; and analyzing the monitored reaction in relation with the tactile stimulation, the sender, and the relationship.

12. The computer program product of claim 11, further comprising:

updating the mapping in the tactile stimulation knowledgebase with the reaction such that the mapping is reinforced when the reaction is positive, the mapping is weakened when the reaction is negative, and the mapping remains unchanged when the reaction is neutral.

13. The computer program product of claim 10, the determining comprising:

monitoring speeches of the sender and the receiver in the beginning of the electronic telecommunication session;

analyzing the speeches from the monitoring by use of one or more cognitive analytic tool, including natural language processing; and concluding the relationship based on detecting any terms from the speeches indicating the relationship.

14. The computer program product of claim 10, the determining comprising:

retrieving respective user profiles of the sender and the receiver, wherein the respective user profiles had been previously generated for the sender and the receiver; and identifying the relationship between the sender and the receiver as provided in the respective user profiles.

15. The computer program product of claim 10, the ascertaining comprising:

monitoring interaction of the participants in the electronic telecommunication session;

discovering the emotion on the sender that is associated with the tactile stimulation from facial expressions, gestures, and words used by the sender toward the receiver in the monitored interaction.

16. The computer program product of claim 10, the identifying comprising:

searching the tactile stimulation knowledgebase for one or more mapping matching the relationship from the determining for the participants, wherein the one or more mapping associates respective relationships and contact points;

selecting the mapping amongst the one or more mapping from the searching based on the tactile stimulation implicated by the emotion of the sender from the ascertaining.

17. The computer program product of claim 10, wherein mappings in the tactile stimulation knowledgebase associate respective elements selected from categories of relationship, contact points on the receiver, sender emotion, tactile stimulation, and reaction by the receiver.

18. The computer program product of claim 10, the commanding comprising:

sending a command signal to a tactile stimulation transducer of the virtual presence user device for the receiver to generate the tactile stimulation with a specific combination of an intensity, a direction, a duration, and a pattern corresponding to the emotion from the ascertaining, wherein the tactile stimulation is an ultrasonic pressure.

19. The computer program product of claim 10, further comprising:

cumulating one or more mappings in the tactile stimulation knowledgebase based on respective social norms of personal bodily contacts based on the relationship for the two or more participants, wherein the respective social norms indicate general rules on personal bodily contact of respective societies to which the two or more participants accustomed, and wherein the two or more participants are represented with respective geographical locations for which a certain social norm on personal bodily contacts is applicable.

20. The computer program product of claim 10, further comprising:
    identifying the tactile stimulation applicable to the contact point according to respective social norms of the two or more participants as reflected in one or more mappings of the tactile stimulation knowledgebase, wherein the mappings in the tactile stimulation knowledgebase associate respective elements selected from categories of relationship, contact points on the receiver, sender emotion, tactile stimulation, and reaction by the receiver, according to general rules on personal bodily contact of respective societies to which the two or more participants accustomed.

21. A system comprising:
    a memory;
    one or more processor in communication with memory; and
    program instructions executable by the one or more processor via the memory to perform a method comprising:
    determining a relationship between two or more participants in an electronic telecommunication session;
    ascertaining that an emotion expressed by a sender toward a receiver, via a user interface utilizing audio, video, and text, implicates a tactile stimulation, wherein the two or more participants include the sender and the receiver;
    identifying a contact point to which the tactile stimulation is applied on the body of the receiver based on the relationship from the determining, wherein the contact point is specified in a tactile stimulation knowledgebase as a mapping between the relationship and the contact point on the receiver;
    commanding a virtual presence user device on the side of the receiver to deliver the tactile stimulation corresponding to the emotion expressed by the sender to the receiver on the contact point from the identifying;
    monitoring the receiver for a reaction to the tactile stimulation delivered upon the commanding;
    analyzing the monitored reaction in relation with the tactile stimulation, the sender, and the relationship; and
    updating the mapping in the tactile stimulation knowledgebase with the reaction such that the mapping is reinforced when the reaction is positive, the mapping is weakened when the reaction is negative, and the mapping remains unchanged when the reaction is neutral.

22. The system of claim 21, the determining comprising:
    monitoring speeches of the sender and the receiver in the beginning of the electronic telecommunication session;
    analyzing the speeches from the monitoring by use of one or more cognitive analytic tool, including natural language processing; and
    concluding the relationship based on detecting any terms from the speeches indicating the relationship.

23. The system of claim 21, the determining comprising:
    retrieving respective user profiles of the sender and the receiver, wherein the respective user profiles had been previously generated for the sender and the receiver; and
    identifying the relationship between the sender and the receiver as provided in the respective user profiles.

24. The system of claim 21, the ascertaining comprising:
    monitoring interaction of the participants in the electronic telecommunication session;
    discovering the emotion on the sender that is associated with the tactile stimulation from facial expressions, gestures, and words used by the sender toward the receiver in the monitored interaction.

25. The system of claim 21, the commanding comprising:
    sending a command signal to a tactile stimulation transducer of the virtual presence user device for the receiver to generate the tactile stimulation with a specific combination of an intensity, a direction, a duration, and a pattern corresponding to the emotion from the ascertaining, wherein the tactile stimulation is an ultrasonic pressure.

* * * * *